United States Patent
Baldwin, Jr.

[15] 3,702,009
[45] Oct. 31, 1972

[54] SIMULATION OF PRESSURE BEHAVIOR IN PETROLEUM RESERVOIRS

[72] Inventor: David E. Baldwin, Jr., Ponca City, Okla.

[73] Assignee: Continental Oil Company, Ponca City, Okla.

[22] Filed: Oct. 23, 1970

[21] Appl. No.: 83,393

[52] U.S. Cl....................................................444/1
[51] Int. Cl..........................G06f 15/20, G06f 15/06
[58] Field of Search..............235/150, 184, 185, 61.6

Primary Examiner—Eugene G. Botz
Assistant Examiner—Edward J. Wise
Attorney—Joseph C. Kotarski, Henry H. Huth, Robert B. Coleman, Jr., William J. Miller and David H. Hill

[57] ABSTRACT

A method for formulating a simple model in simulation of pressure behavior in a petroleum reservoir, the method consisting of utilization of electronic data processing apparatus for performing a novel computational approach to establishment of unknown pressure quantities as deduced from probabilities of known parameters. The method utilizes a variation on the Monte Carlo or Random Walk technique, a variation known as the Exodus modification, which enables stochastic simulation of a petroleum reservoir in terms of its pressure behavior and patterns throughout.

1 Claim, 8 Drawing Figures

INVENTOR
DAVID E. BALDWIN JR.

BY
William J. Miller
ATTORNEY

INVENTOR
DAVID E. BALDWIN JR.
BY
William J. Miller
ATTORNEY

SIMULATION OF PRESSURE BEHAVIOR IN PETROLEUM RESERVOIRS

BACKGROUND OF THE INVENTION

1. Field of the Invention

The invention relates generally to a method for determining certain characteristics of petroleum reservoirs and, more particularly, but not by way of limitation, it relates to improved methods for pressure transient analysis of such reservoirs through simulation of a numerical model.

2. Description of the Prior Art

The prior art methods for compiling information relating to pressure variations throughout a petroleum reservoir rely upon solution of specific equations including known parameters through long and exhaustive computation to determine the unknown quantities. There are two types of solutions which are currently employed to derive such data: In a few idealized cases there is what is termed the analytical solution which can be employed to compute a series of pressure transient values, a number of which will then yield certain cross-section information as to the entire petroleum reservoir; there is also a solution known as a finite difference solution which is more generalized but which still suffers from inaccuracy and excessive computation time. Even when programmed for rapid calculation on modern day computers, both the analytical solutions and finite difference solutions suffer the short-coming of requiring an excessive amount of computer time, and both may yield solution results which are somewhat unreliable for certain input data situations.

SUMMARY OF THE INVENTION

The present invention contemplates an improved form of finite difference computational method for compiling data relating to simulated pressure behavior in petroleum reservoirs. In a more limited aspect, the invention consists of utilizing an improved stochastic method of evaluating and classifying known data relating to a petroleum reservoir to derive pressure transient characteristics for the entire reservoir volume. Such stochastic procedure consists of the utilization of the exodus modification of Monte Carlo probability computation such that an electronic computational device is controlled through its program to define transient pressure behavior in a single phase petroleum reservoir in response to input of known reservoir parameters.

Therefore, it is an object of the invention to enable a method for more reliable and more rapid evaluation of pressure behavior in a petroleum reservoir.

It is also an object of the present invention to provide a stochastic method for accurately designating pressure characteristics at a selected point in a single phase petroleum reservoir.

Finally, it is an object of the present invention to provide a method for programming a computational device such that it will formulate a numerical model simulative of pressure behavior in a petroleum reservoir.

Other objects and advantages of the invention will be evident in the following detailed description when read in conjunction with the accompanying drawings which illustrate the invention.

DETAILED DESCRIPTION OF THE INVENTION

Figure 1:
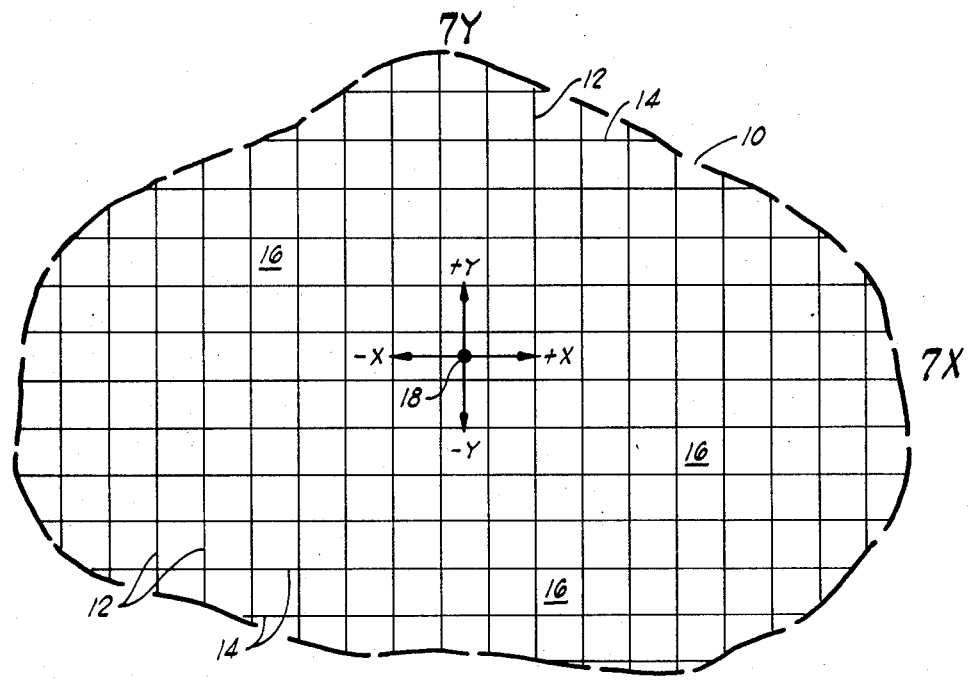
FIG. 1 is a two-dimensional plan view of a petroleum reservoir as it might be related to grid divisions established in accordance with the present invention.

Present day emphasis on savings in computer time, especially when coupled with more accurate results as obtained in some cases, makes especially attractive the present invention for rapid determination of transient oil pressure behavior within sub-terrain oil reservoirs. With some difference to prior calculational methods, i.e. finite difference and analytical solution methods, which find especial use in particular applications, the present invention utilizes a new computational approach required in constructing simulated models of single phase oil reservoirs embodying various known and unknown parameters to a sufficiently accurate degree.

Such a newly applied calculational method is known as an exodus modification of the Monte Carlo or "Random Walk" technique, and such numerical procedure is extremely accurate while enabling a significant saving in computation time over conventional finite difference methods. A complete disclosure of the new method for solving selected partial differential equations is set forth in the Journal of Heat Transfer, Transactions of the ASME, August, 1968, pages 328 through 332; the article being specifically entitled "A Modification to the Monte Carlo Method—the Exodus Method" by A. F. Emery and W. W. Carson.

The Exodus modification is unique in that it is not dependent upon a random number generator, and it may find application to any problem which is capable of being represented as a nodal network. In the present application, it is applied to single phase oil reservoirs as represented in such nodal configuration or grid network as will be further described below. In such pressure transient problems, the exodus modification enables solutions as required at selected points rather than over an entire finite grid system.

The Exodus modification is unique in that it is not dependent upon a random number generator, and it may find application to any problem which is capable of being represented as a nodal network. In the present application, it is applied to single phase oil reservoirs, as represented in such nodal configuration or grid network as will be further described below. In such pressure transient problems, the exodus modification enables solutions as required at selected points rather than over an entire finite grid system.

The flow of a slightly compressible fluid, e.g. crude oil, in a porous medium of non-uniform permeability is governed by the following partial differential equation;

$$\nabla^2 P = \frac{\phi u c}{K} \frac{\partial P}{\partial t} \quad (1)$$

which may be further equated to $$\frac{\partial}{\partial x}\left(K_x \frac{\partial P}{\partial x}\right) + \frac{\partial}{\partial y}\left(K_y \frac{\partial P}{\partial y}\right) + \frac{\partial}{\partial z}\left(K_z \frac{\partial P}{\partial z}\right) \quad (2)$$

where $x$, $y$ and $z$ represent distance variables, P is equal to pressure, $K$ is equal to permeability, $\phi$ is equal to porosity, $c$ is equal to compressibility, $u$ is equal to viscosity and $t$ is equal to time.

The explicit finite difference analog of value (2) is obtained by replacing the partial derivitives with their respective finite difference approximation such that $$\frac{K_{i-1/2,j,k}(P^{n-1}_{i-1,j,k} - P^{n-1}_{i,j,k}) - K_{i+1/2,j,k}(P^{n-1}_{i,j,k} - P^{n-1}_{i+1,j,k})}{\Delta x^2}$$

$$+ \frac{K_{i,j-1/2,k}(P^{n-1}_{i,j-1,k} - P^{n-1}_{i,j,k}) - K_{i,j+1/2,k}(P^{n-1}_{i,j,k} - P^{n-1}_{i,j+1,k})}{\Delta y^2}$$

$$+ \frac{K_{i,j,k-1/2}(P^{n-1}_{i,j,k-1} - P^{n-1}_{i,j,k}) - K_{i,j,k+1/2}(P^{n-1}_{i,j,k} - P^{n-1}_{i,j,k+1})}{\Delta z^2}$$

$$- \frac{Q_{i,j,k} u}{\Delta x \Delta y \Delta z} = \frac{\phi u c}{\Delta t}(P^n_{i,j,k} - P^{n-1}_{i,j,k}) \quad (3)$$

where $Q$ is flow rate, $n$ is equal to a unit time step index, and $i, j, k$ are grid indices in respective $x, y, z$ directions.

In the above equation a source term including $Q$ has been added to represent the effect of wells. Upon a simplification and collection of terms, equation (3) will then become $$P^n_{i,j,k} = p_0 P^{n-1}_{i,j,k} + p_{x+} P^{n-1}_{i+1,j,k} + p_{x-} P^{n-1}_{i-1,j,k} + p_{y+} P^{n-1}_{i,j+1,k}$$
$$+ p_{y-} P^{n-1}_{i,j-1,k} + p_{z+} P^{n-1}_{i,j,k+1} + p_{z-} P^{n-1}_{i,j,k-1} - \bar{Q}_{i,j,k} \quad (4)$$

where $P$ represents probability.

Equation (4) can be given a probablistic interpretation as follows: If a particle is at point $x, y, z$ at a time $t$, it has a probability $p_0$ of remaining at that point, and it has probabilities $p_{x+}$, $p_{x-}$, $p_{y+}$, $p_{y-}$, $p_{z+}$, and $p_{z-}$ of moving to the adjacent grid points. In addition, the particle will arrive at its new location at time $t-\Delta t$. The individual probability values may be represented as $$p_{x+} = \left(\frac{\Delta t}{\phi u c \Delta x^2}\right)(K_{i+1/2,j,k}); \quad p_{x-} = \left(\frac{\Delta t}{\phi u c \Delta x^2}\right)(K_{i-1/2,j,k})$$

$$p_{y+} = \left(\frac{\Delta t}{\phi u c \Delta y^2}\right)(K_{i,j+1/2,k}); \quad p_{y-} = \left(\frac{\Delta t}{\phi u c \Delta y^2}\right)(K_{i,j-1/2,k})$$

$$p_{z+} = \left(\frac{\Delta t}{\phi u c \Delta y^2}\right)(K_{i,j,k+1/2})$$

and $$p_{z-} = \left(\frac{\Delta t}{\phi u c \Delta y^2}\right)(K_{i,j,k-1/1})$$

where $$p_0 = 1 - p_{x+} - p_{x-} - p_{y+} - p_{y-} - p_{z+} - p_{z-} \quad (5)$$

The classical Monte Carlo, or random walk, method for obtaining a solution to equation (4) at the point $(x, y, z)$, involves dispatching a particle from this point and allowing it to move to other points in a grid network according to the individual path probabilities. The direction the particle moves at each step is determined by random generated numbers. The particle performs $n(n=t/\Delta t)$ random walks, at the end of which time ($t=0$) the initial pressure $P_o$ is tallied if the particle is in the interior of the system; otherwise, the boundary pressure $P_b$ is tallied. Also, each time a particle arrives at a point containing a source, i.e. a point having a well outlet of known pressure characteristic, the strength of the source is tallied. A large number of such random walks are performed and the average tally represents an approximate solution to equation (4) at a point $(x, y, z)$ at times $t$. It can be shown that as the number of walkers increases without bound, the average tally approaches the exact solution to the difference equation.

Boundary conditions are easily handled with the Monte Carlo method. The no flow, or zero permeability, boundary which is most encountered in pressure transient problems is accounted for by setting the probabilities across the boundary equal to zero. Thus, a particle is reflected whenever it reaches a boundary and must always remain at an interior grid point. For the constant pressure boundary condition, a particle, upon reaching the boundary, tallies the boundary pressure an then is removed from the system. A constant flux boundary is treated in the same manner as the no flow boundary with the exception that, whenever a particle is reflected, the strength of the flux is scored.

The Monte Carlo method, as described above, possesses two important properties in that a solution is obtained at a single, selected point, and such solutions can be obtained for a series of time steps without the necessity of performing the random walk procedure for each time step. Thus, advantage is taken of the fact that the average random walk tally obtained in going from $t$ to $t \cdot \Delta t$ is equivalent to that which would be obtained in going from $\Delta t$ to zero. Similarly, a tally obtained in going from $t$ to $t-2\Delta t$ is the same as that going from $2\Delta t$ to zero, and so forth. In this manner, random walks need only be performed for the maximum time of interest while solutions for smaller times can be obtained from intermediate random walk tallies.

This random walk concept, as described immediately above, presents a serious computational difficulty in that a large number of random walks must be performed in order to obtain acceptable accuracy. This difficulty is compounded by the fact that the solutions tend to oscillate instead of smoothly approaching the exact value as the number of walkers increases. As a result, most applications of pure Monte Carlo method are characterized by lesser accuracy and excessive computation time.

The utilization of the exodus modification serves to eliminate the above difficulties as to sacrifice of time an accuracy. This modification, in effect, eliminates the random walk and thus, the errors associated with probability sampling. The exodus modification is based on the fact that the probabilities, as defined by equation (4), are fixed, known functions of the system properties. Thus, it is not necessary to perform single random walks whose paths are controlled by randomly generated numbers; but instead, a large number of particles can be dispatched from a point simultaneously. The fractions of such particles which move in each direction during a time step are then equal to the probabilities associated with a point. With the exception of this, the general procedure in programming and carrying out the exodus modification of computation is similar to that for the standard Monte Carlo method as previously described.

In simulating the reservoir model, the rectangular grid system such as shown in FIG. 1 is utilized to provide ordered generation of probability occurrences. As shown in FIG. 1, a plan view of an oil reservoir may take actual shape of outline 10 overlaid by grid coordinates consisting of y-axis coordinates 12 and x-axis coordinates 14 which serve to define the plurality of grid blocks 16 within outline 10. In the illustrated situation, a central grid block 16 is designated as one containing a source or well 18, this being the point of the reservoir where certain parameters including pressure P, flow rate Q, and other determinable parameters are known. Consideration of such known parameters at central grid block 18 then enables probability computation in terms of time $t$ and the probable position throughout the reservoir as embodied in the basic equation (4).

Figure 2:
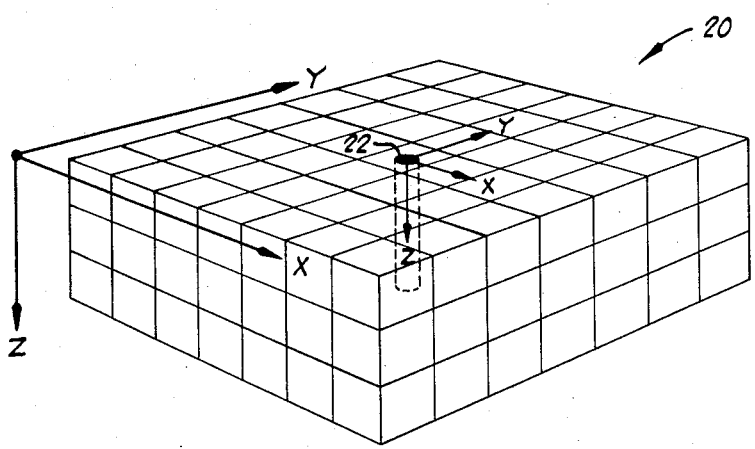
FIG. 2 is a three-dimensional view of a reservoir model as established in accordance with the method of the present invention.

Actually, the method result is most representative of more idealized volumetric bodies. Thus, the three-dimensional illustration of FIG. 2 illustrates a form of oil reservoir 20 which is formed as a rectangular solid formed seven units by seven units and having a three unit thickness in the z dimension. A well bore 22 is depicted as being present through the center of volume 20. It should be understood that any of various volumetric shapes and relative well positions may be assembled into the data input to the computational facility so that necessary walker origins and boundary limitations are present in the model. Such variations are a matter of programming within the skill of the persons controlling the computational instrumentality.

Figure 3:
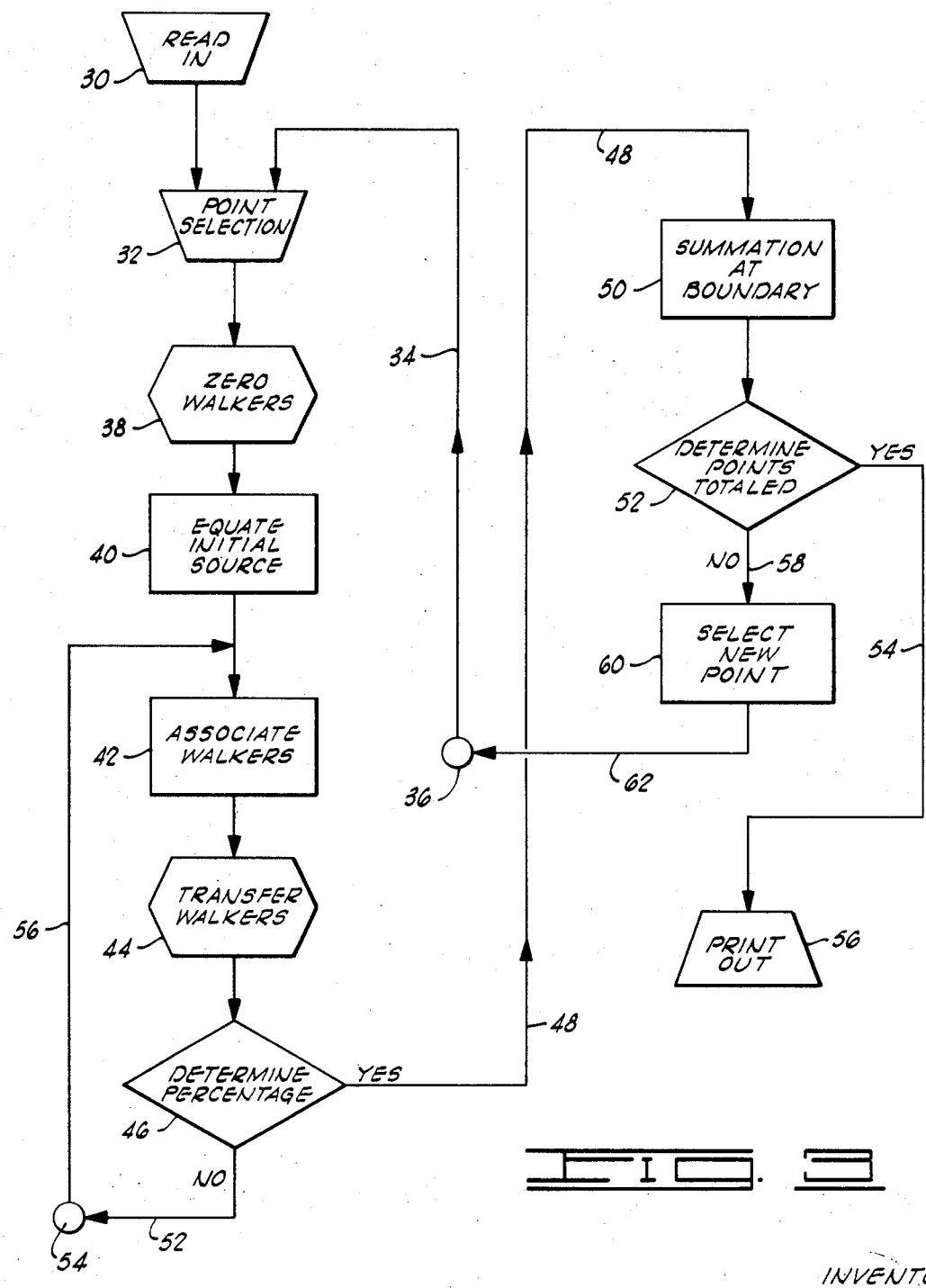
FIG. 3 is a block diagram showing functional flow of data in electronic data processing apparatus programmed to carry out the method of the invention.

The exodus modification of the Monte Carlo method has been carried out and is presently programmed for calculation in the IBM 360/65 computer, a general purpose type of computer. A flow chart outline of such programmed operation is shown in FIG. 3, an illustration of a computer program which is utilized in calculating the effects of a multitude of walkers proceeding through probability disposition in accordance with the exodus modified Monte Carlo method. The program, as fully charted in FIG. 3, is essentially that which is outlined in the above-referenced publication with the addition of two essential differences, that of the inclusion of no flow boundary conditions and the use of the superposition principle to handle time variations in source strengths.

As shown in FIG. 3, parameter input values are introduced at a read-in stage 30. Such input data consists of boundary values as here set to a no flow or zero probability condition ($p=0$) for all boundary indices ($i$, $j$). The source index values $Q(i,j)$ are also input as are the individual probabilities throughout the matrix system which is representative of the reservoir, i.e. $p(i, j, k)$ for all interior index points.

A next stage in data flow is point selection stage 32 which serves to outline and verify that source point in the reservoir volume for which it is desired to derive pressure transient analysis. Data input to point selection stage 32 ten consists of input M, N which equates to the $i, j$ indices or surface index points where the particular solution is sought. Data flow on a line 34 from connector 36 provides input data to point selection stage 32 which serves to select a new point M N, as will be further described below.

Data flow from point selection 32 then proceeds to zero walker 38, a predefined process stage, wherein the multitude of walkers are oriented. That is, the number of walkers at all nodule points are set to zero in each of a first surface matrix A $(i,j)$ and a second surface matrix B $(i,j)$. Further, there is input (for example) $10^6$ walkers at point M, N, the source point on the reservoir surface representation. With reference to FIG. 2, the well bore 22 would be represented as source indices M, N in the surface $x$, $y$, coordinate system, and each of matrices A and B in terms of $i$ and $j$ would be representative of the $x$, $y$ surface dimension of the reservoir volume 20.

Next data processing takes place in an equate initial source stage 40 wherein the selected source is set equal to a flow rate $Q$ which is included in the source term in equation (3) and (4) above. The source term is added to represent the generalized effect of wells for the particular viscosity of production. A next processing stage, the associate walkers stage 42 provides means whereby all interior points as represented by matrix A in terms of $i,j$ are surveyed, and the walkers are then distributed to the appropriate nodal points in accordance with the matrix B $(i\ j)$. The walkers having been inserted, the predefined process of transfer walker stage 44 then allows exploration of the interior points of the reservoir model. The mechanism includes transfer of all walkers from matrix B $(i, j)$ to matrix A $(i, j)$; and, thereafter, the zeroing of matrix B $(i,j)$ will account for the source terms at each nodal point. The stage 44 also provides a count of the percentage number of walkers in the interior indices of the model.

A determine percentage stage 46 provides decision as to whether or not a data result is of sufficient tally. Thus, the determine percentage stage 46 will ask whether or not the percentage is smaller than a set amount and, if yes, data flow procedes via line 48 to a summation at boundary stage 50; alternatively, if the answer is no, data flow proceeds via line 52 and connector 54 for recycle via line 56 with return to an associate walkers stage 42. Re-input to associate walkers stage 42 serves to redistribute the walkers once again to assure that some selected high percentage of walkers will have proceeded to at least the boundary indices. Due to the nature of the petroleum reservoir, and the no flow boundary condition, special data is inserted to account for probabilities of reflective procession within the matrix index.

The summation at boundary stage 50 serves to derive a total tally or summation indicating all interior source contributions plus boundary contributions. Since boundary contributions are zero or no flow, it is only necessary to employ simple position to determine the irregular cut-off. Data output from summation of boundary stage 50 then represents a result equal to tally of that stage. This result is input to determine points totaled stage 52 wherein a decision is made as to whether or not all points $i, j$ at which the solution is desired have been calculated. If data output indicates that all points have been totaled, output is via line 54 to a suitable form of print out mechanism 56 of conventional application. If the output from decision stage 52 is negative, data flow is via line 58 to a select new point stage 60 which serves to recycle information via line 62 and terminal 36 for re-input to point selection stage 32. The select new point stage 60 introduces new source index values of M and N for re-cycling.

The advantages of computational probability construction using the exodus method are readily apparent. Due to the large number of particles which are used, and the fact that fractional particles are allowed, the exodus modification is essentially equivalent to the Monte Carlo method with inclusion of an infinite number of random walks. Thus, accuracy of the resulting solutions is independent of probability sampling error and is strictly a function of numerical proceeding. Also, the additional work involved in tracking a large number of particles under fixed control is very little more than for a single particle moving randomly. These characteristics result in a large increase in accuracy and a significant saving in computation time. For example, the calculation time in a representative problem was approximately 1.5 minutes which is at least an order of magnitude less than would be experienced with other finite difference methods of determination for the transient pressure problem.

Figure 4:
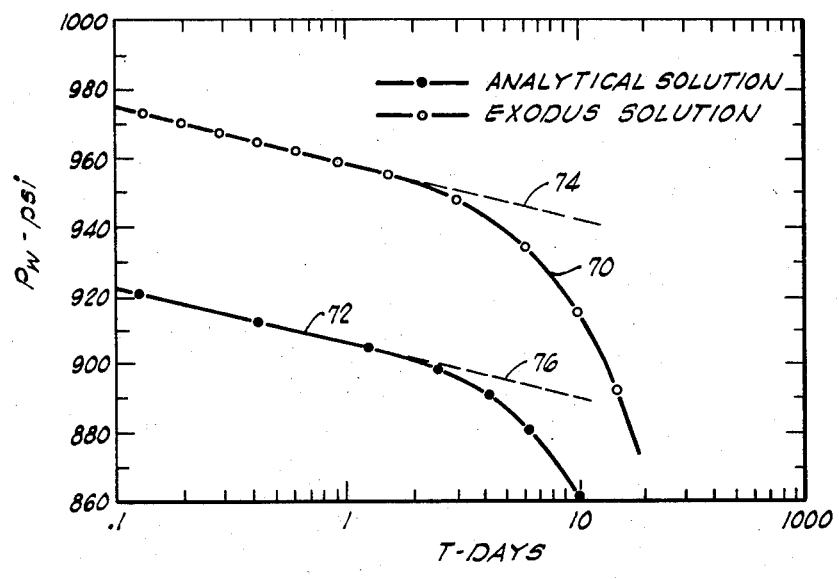
FIG. 4 is a graph comparing results of an analytical solution and a solution compiled in accordance with the invention for draw down of a reservoir.
Figure 5:
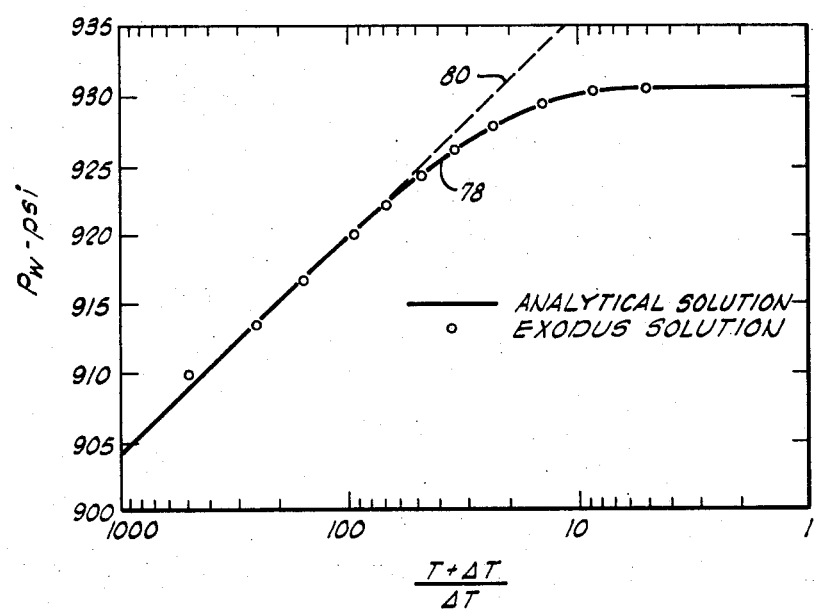
FIG. 5 is a graph illustrating analytical and monte carlo solutions for pressure build-up of the same simulated reservoir model of FIG. 4.

FIGS. 4 through 8 relate to various test results which tend to prove out the method of the invention as will be further described below. FIGS. 4 and 5 represent findings for a first test case which consisted of a simulated pressure draw-down build-up in a square, homogenous reservoir. The reservoir was 2,100 on a side, 10 feet thick and contained a single well in the center. This reservoir may be compared to the square reservoir of FIG. 2 with the exception that the $(x, y)$ coordinate was constructed on a 21 by 21 grid network of 10 foot thickness, and the entire simulation required 633 time steps or $\Delta t$ increments.

Input data values respecting the simulated model were as follows: Permeability $K = 100$ millidarcy porosity; $\phi = 20$ percent (measure of void space); fluid viscosity $u = 1$ centipoise; compressability $c = 0.0005$ psi$^{-1}$; and initial pressure $P_o = 1.000$ psi. The well was produced for 15 days at 100 barrels per day and then shut in for a period of 5 days.

The draw down portion of the test is shown in FIG. 4 along with the equivalent analytical solution. The two solutions are very similar with the exception that the exodus Monte Carlo solution is consistently higher by about 50 psi. This displacement of the two solutions is as expected since the analytical method used a well-bore radius of one-half foot and the numerical exodus solution used a cell of 100 by 100 feet in the overall grid network to represent the well. By the standard methods of analyses the straight line portion of both curves results in a correct value for the transmissability $K \cdot H/u$, i.e. 1,000 millidarcy-feet per centipoise.

FIG. 5 represents the pressure buildup results as obtained by the exodus solution and as would be derived by analytical computation. Thus, the compound curve 78 exhibits good agreement as between the exodus solution and the analytical solution shown in line representation. In contrast to the draw down results of FIG. 4, the two solutions are virtually identical as the coarse grid representation of the well or source has little or no effect on the build up. As in the case of the drawn-down curve of FIG. 4, the slope, as shown by dashed line 80, yields the correct value for transmissbility and, in addition, the extrapolated portion of the curve yields the correct average pressure. There is then very close agreement as to data constructed by a analytical solution and that of the exodus modification which was obtained in much less computational time.

Figure 6:
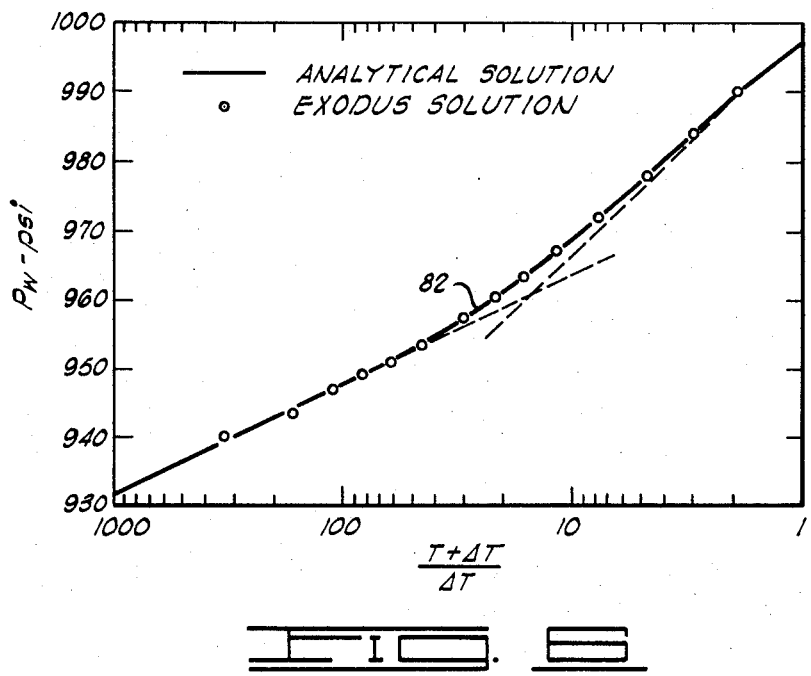
FIG. 6 is a graph illustrating a comparison of results obtained by both the analytical solution and methods of the present invention, the reservoir being identical to the simulations of FIGS. 4 and 5 except that the well source was moved within one grid location from the edge of the reservoir.

A second test case was simulated and the results are shown in FIG. 6. The reservoir was the same as that for FIG. 4 and 5, i.e. 2,100 by 2,100 feet on a 21 by 21 grid and 10 feet in thickness, with the exception that the well or course was moved to within one grid location from the edge of the reservoir (150 feet). The purpose of this case was to test the ability of the model to quantitativity detect the presence of barriers. As can be seen from the plot, the exodus modification simulated the effect of the barrier equally as well as the analytical solution, as noted from comparison of indicators along curve 82. This result is particularly significant considering the fact there was only one computational grid between the well and the boundary.

Figure 7:
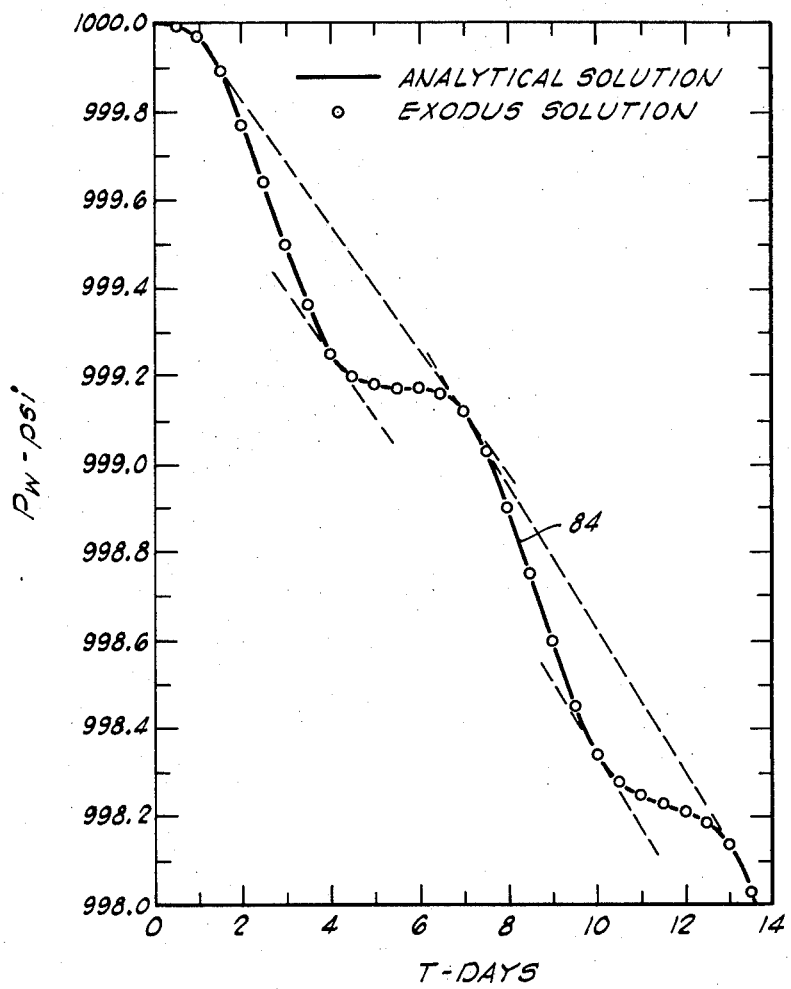
FIG. 7 illustrates a comparison of data derived in accordance with the invention with that of an analytical solution for a reservoir equivalent undergoing test drawdown.

Referring now to FIG. 7, still another test case is illustrated wherein a pulse interference test is carried out. For this case the reservoir system was the same as for the first two cases (FIGS. 4 and 5). The pulsed well and the observation well were positioned on a diagonal of the square at $x, y$ grid locations (8, 8) and (14, 14). Each pulse cycle consist of 3 days of production at thirty barrels per day following by 3 days of shut in. Three such cycles were actually simulated but only the first two are shown in the FIG. 7 representation, i.e. the compounded curve 84 showing both analytical and exodus modification results. As can be noted from curve 84, the exodus modification of Monte Carlo solution and the analytical solution exhibit excellent agreement through all variations of the pulse interference curve.

From the results of the above test cases it must be concluded that the exodus modification of the Monte Carlo model is capable of accurately simulating pressure transient behavior in situations where well-bore effects are relatively unimportant. The coarse computational grid network does not cause appreciable error in the solution of these cases. In addition, the use of small time steps effectively minimizes the time truncation error which is normally encountered in finite difference methods. The use of such small time steps (e.g. 0.316 days for the above test cases) does not, in general, impose a serious limitation to the utility of the exodus modification because of its great computational speed. For the above test cases, the calculational time averaged 0.000163 seconds per grid per time step as computed on the IBM 360/65. Thus, the entire simulation for the test case of FIGS. 4 and 5 required only 46 seconds of computer time, a very much reduced time consumption in comparison with prior types of transient analysis technique.

Figure 8:
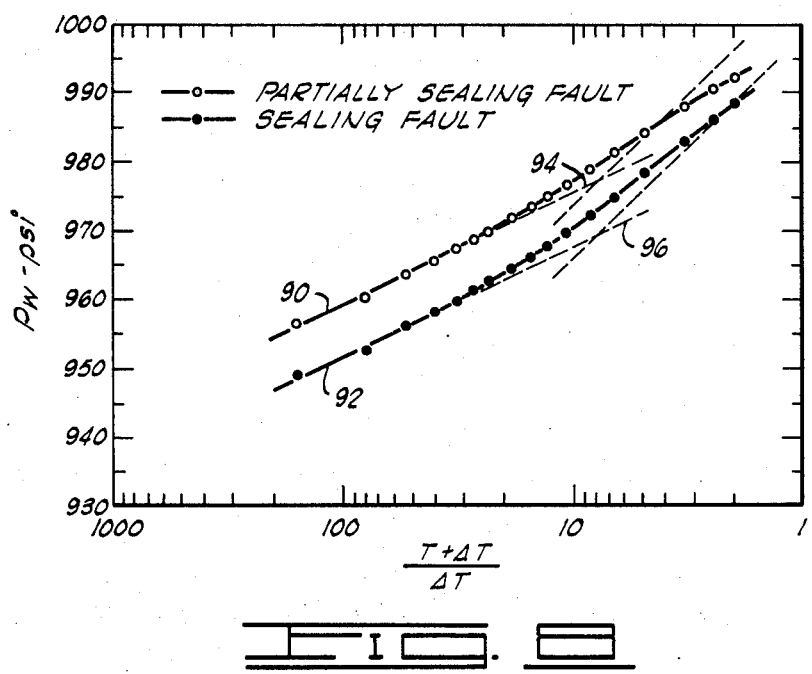
FIG. 8 illustrates comparison of the invention method and prior analytical solution for simulated reservoirs including a partially sealing fault and a sealing fault.

One of the major applications of numerical methods in pressure transient analysis is in the area of defining and investigating effects of reservoir heterogeneities. The graphic representation of FIG. 8 provides a test case which simulates the effects of the partially and fully sealing faults to derive comparison as between the two methods of analyses. The reservoir system was the same as for the test case of FIg. 6 except that the reservoir was extended an equal distance beyond the barrier (42 by 21 grids), and the impermeable barrier was replaced by a column of cells which had a permeability of 10 millidarcy. As would be expected, the initial straight line portions of the curves 90 and 92 have the same slope, dashed lines 94 and 96, respectively, although the two are displaced from each other due to the difference in reservoir size. The second or extended straight line portion exhibits a different slope due to the fact that the partially sealing fault of curve 90 is not a complete reflection boundary.

The foregoing discloses a method for simulating pressure behavior in petroleum reservoirs, which method results in a vary large saving in computation time along with a considerable increase in overall accuracy. It has become evident too that the saving in computation time becomes especially attractive when applied to petroleum reservoirs since the pressure need be calculated at only one point, i.e. at the observation well, rather than for the entire system as is the case with prior used determination methods. The invention as disclosed sets forth a simple mathematical model for simulating pressure behavior, and such simulation is carried out with great saving in time while retaining the ability to account for various sub-surface anomalies peculiar to the particular reservoir problem.

It should be understood that changes may be made in the combination and arrangement of steps as heretofore set forth in the specification and shown in the drawings; it also being understood that changes may be made in the embodiments disclosed without departing from the spirit and scope of the invention as defined in the following claims.

What is claimed is:

1. The method of operating a general purpose digital computer for simulation of pressure behavior in petroleum reservoirs, comprising the steps of:

equating said reservoir to a volumetric grid system of unit cubic portions as represented between plural matrix index points;

entering data for all boundary values, the source value, and probability values for each index of said plural index points;

providing data input and recognition of index points describing the particular point equatable to a source position where solution is desired;

entering input of a plurality of walkers at a point reference to the source index point;

entering data which equates the initial source value to a term proportional to actual reservoir pressure;

collecting and evaluating data for each of the interior index points thereafter to distribute walkers to the appropriate nodal index point to derive a count for the percentage number of walkers still remaining in the interior index portion;

testing to ascertain if more than a pre-determined number of said walkers have reached a boundary index portion, and tallying the sum of interior index portion contributions plus boundary portion contribustions when the test is affirmative; and ascertaining whether or not all index points at which the solution is desired have been computed and, if affirmative, printing out the resulting probability enumeration.

* * * * *